UNITED STATES PATENT OFFICE.

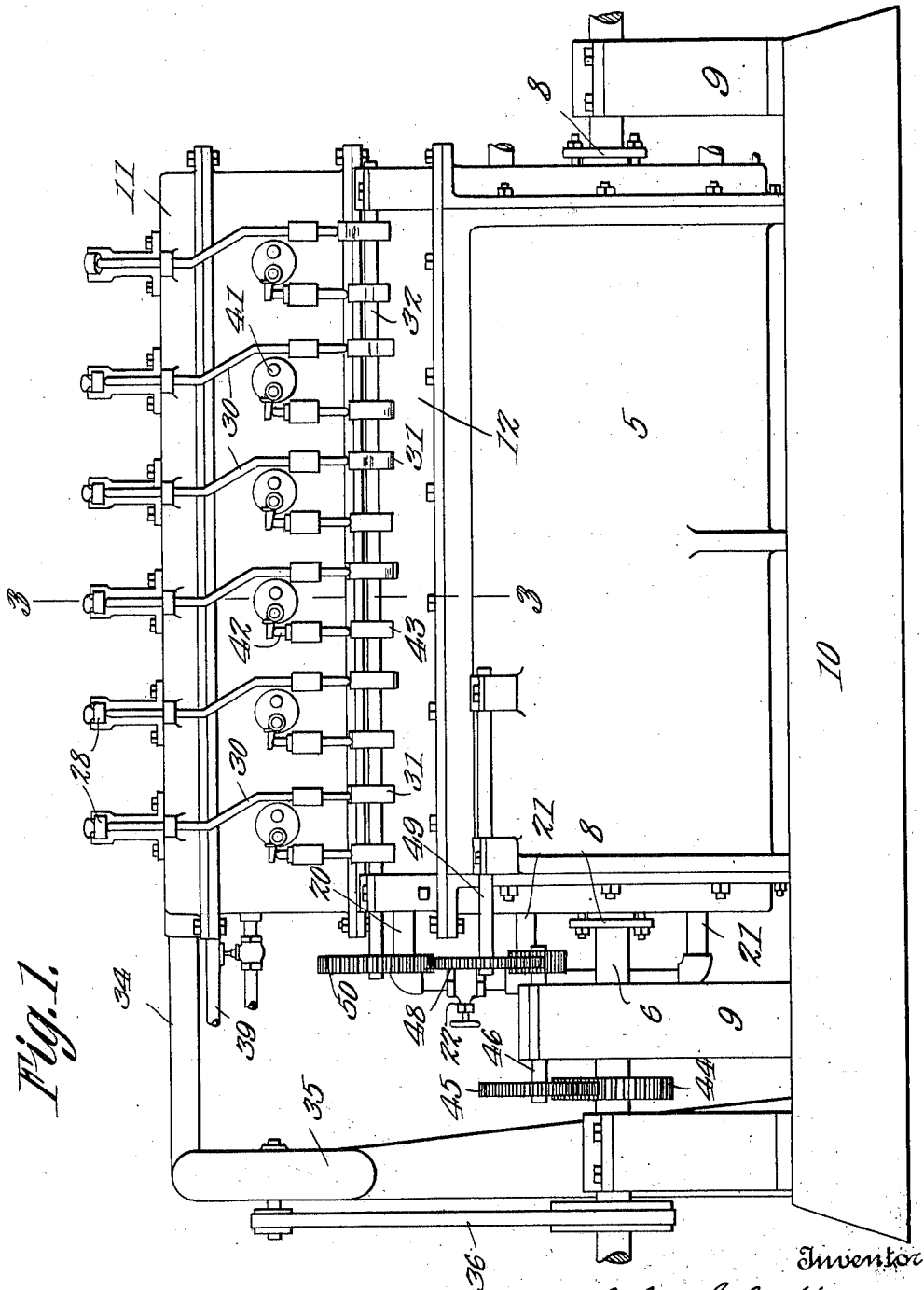

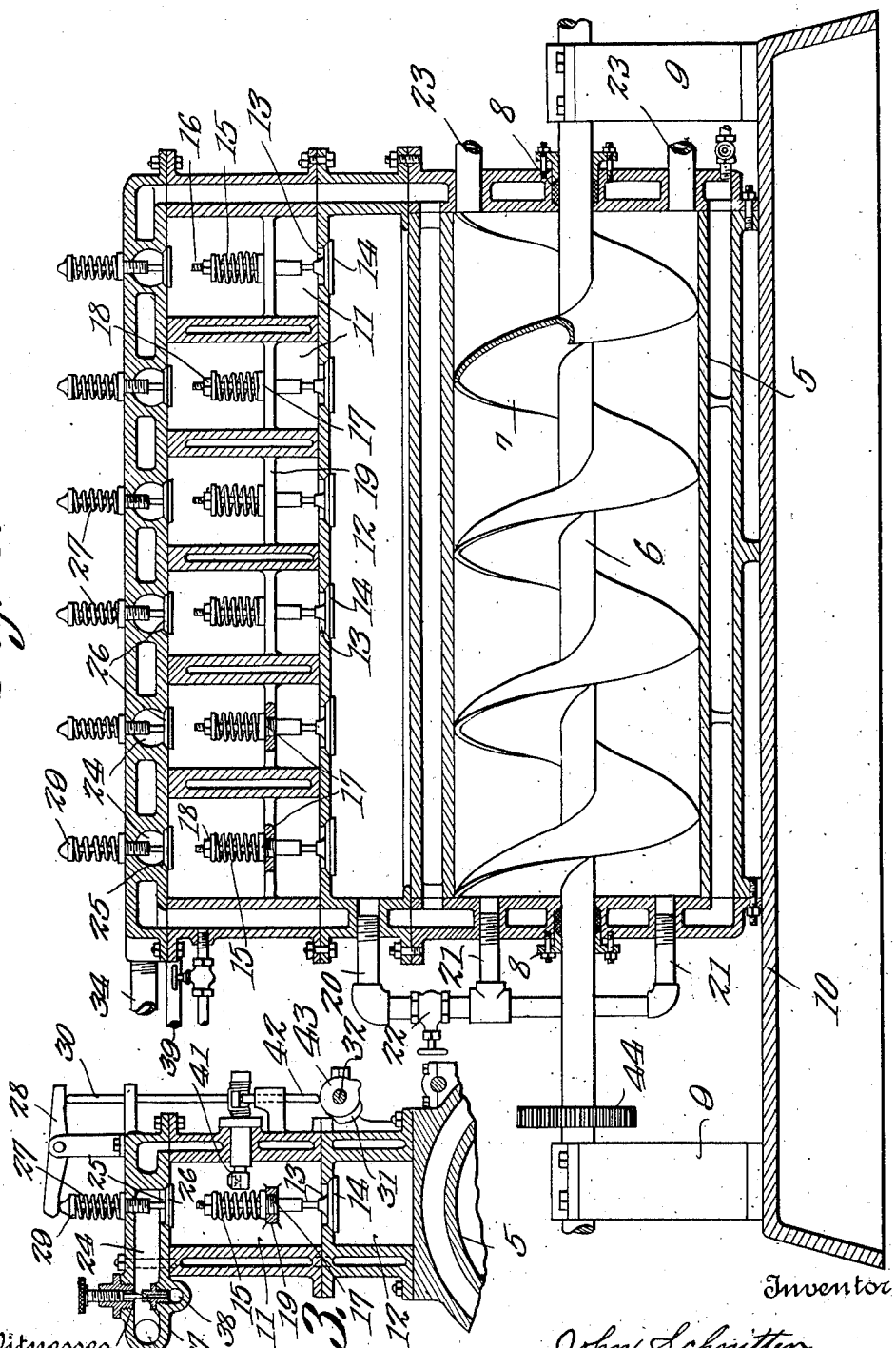

JOHN SCHNITTER, OF BALTIMORE, MARYLAND.

ROTARY INTERNAL-COMBUSTION ENGINE.

1,112,844.   Specification of Letters Patent.   Patented Oct. 6, 1914.

Application filed November 14, 1913. Serial No. 800,907.

*To all whom it may concern:*

Be it known that I, JOHN SCHNITTER, a citizen of the United States, residing at Baltimore city, State of Maryland, have invented certain new and useful Improvements in Rotary Internal-Combustion Engines, of which the following is a specification.

This invention relates to rotary internal-combustion engines, and its object is to provide novel and improved means for operating the same, a series of pressure-generating chambers being provided which are removed from the rotor and the inclosing casing of the same, said chambers discharging into a reservoir which is connected to the casing of the rotor to discharge thereinto.

The invention also has for its object to provide a novel and improved arrangement of pressure-generating chambers, and means for introducing an explosive mixture thereinto.

A further object of the invention is to provide a novel and improved form of rotor, the same being constructed to develop a maximum amount of power.

These objects are attained by the combination and arrangement of parts to be hereinafter described and claimed, reference being had to the accompanying drawings, in which—

Figure 1 is an elevation of the engine; Fig. 2 is a central longitudinal section thereof and Fig. 3 is a vertical section on the line 3—3 of Fig. 1.

In the drawings, 5 denotes a cylinder which incloses a rotor comprising a shaft or central body 6 carrying a helical vane 7, which latter extends throughout the entire length of the shaft inside the cylinder. The vane projects radially from the shaft a distance to bring its edge in contact with the cylinder wall. The motive fluid is discharged into one end of the cylinder, and exhaust takes place from the opposite end thereof. The flow is axial, or parallel to the shaft, and the impact or pressure against the vane rotates the same and the shaft. The vane is dished in a plane perpendicular to the shaft, the concavity thus formed facing the inlet end of the cylinder. This shape of the vane gives a better propulsive effect.

The ends of the cylinder 5 are provided with stuffing boxes 8, through which latter the shaft 6 passes, and adjacent to each end of the cylinder, on the outside thereof, are bearings 9 in which the shaft is supported, said bearings being mounted on a suitable base 10, which latter also supports the cylinder.

Associated with the engine is a series of pressure-generating chambers 11 which are removed from the cylinder 5. A charge of liquid fuel is periodically sprayed into the chambers and exploded therein. The expanding products, under high pressure, are carried to the cylinder and discharged thereinto against the vane 7. The chambers may be cylindrical in shape, and they are mounted in a row on a reservoir 12, which latter, in turn, is mounted on top of the cylinder 5. Thus a compact structure is had, and the space occupied by the engine is reduced to a minimum. Each chamber 11 has an outlet port 13 into the reservoir 12, said port being controlled by a valve 14 which opens into the reservoir, and is held normally seated by a spring 15 coiled around the valve stem 16, between a guide sleeve 17 and an abutment 18 on the valve stem. The valve stem passes through the sleeve 17, the latter being carried by a cross bar 19 in the chamber 11. From the reservoir leads a pipe or conduit 20 having branches 21, which latter are connected, at diametrically opposite points, to the inlet end of the cylinder 5 to discharge thereinto. The pipe has a valve 22. To the outlet end of the cylinder are connected diametrically opposite exhaust pipes 23.

In the top of each chamber 11 is a conduit 24 having a port 25 which opens into said chamber. Liquid fuel is sprayed into the chamber through this port, the admission being controlled by a valve 26, which latter may be an ordinary puppet valve held closed by a spring 27, and periodically forced open by a lever 28, one end of which lever engages the stem 29 of the valve. The other end of the lever is engaged by a slide rod 30 operated by a cam 31 on a shaft 32 geared to the shaft 6. Each conduit 24 has an air inlet 33 connected to the discharge pipe 34 of an air pump 35, which latter may be an ordinary centrifugal blower driven from the shaft 6 by being belted or otherwise operatively connected thereto, as indicated at 36.

Into each conduit 24 extends a fuel nozzle 37 connected to a duct 38 in the wall of the conduit. A pipe 39, leading from a suitable source of liquid fuel (not shown), is connected to the duct. A needle valve 40 is provided for regulating the area of the nozzle outlet. The nozzle is located between the air inlet 33 and the admission port 25.

In each chamber 11 is an ignition device 41, which may be of the make-and-break type, actuated by a slide rod 42 operated by a cam 43 on the shaft 32.

In operation, when the valve 26 opens, air is caused to flow at high velocity past the mouth of the nozzle 37, whereby an atomizing action is produced, and the liquid fuel is blown into a fine spray, in which form it is admitted into the chamber 11, and ignited therein by the device 41. As the explosion takes place in the chamber 11, the valve 14 is blown open, and the expanding products under high pressure enter the reservoir 12, from which latter they pass, by the way of the conduit 20 and its branches 21 into the cylinder 5, and by their impact against the vane 7 rotate the same and its shaft 6. The drawings show six pressure-generating chambers 11, in view of which a sufficient volume of expanding products is discharged into the reservoir 12 to insure a steady drive of the engine.

The driving connection between the shafts 6 and 32 is made by a gear 44 on the former meshing with a gear 45 on a countershaft 46, on which latter is a pinion 47 which is in mesh with a gear 48 on a second countershaft 49, the gear 48 being in mesh with a gear 50 on the shaft 32.

The cylinder 5, the reservoir 12 and the chambers 11 will all be waterjacketed as shown in Fig. 2.

The structure herein described produces a simple, powerful and steady-running engine, and one which can be cheaply operated, it being designed more particularly for using a cheap grade of oil, although gasolene or other liquid hydrocarbons may be employed with good results. The helical rotor is not limited to internal-combustion engines, but may be applied to steam or other fluid-pressure motors.

While the preferred form of the invention has been shown and described, it is to be understood that many changes in the structural details may be made without departure from the spirit and scope of the invention claimed hereinafter.

I claim:

1. A rotary internal combustion engine, comprising a cylinder, a reservoir, and a series of pressure generating chambers, a rotor in said cylinder, an outlet port for each pressure generating chamber and an outwardly opening pressure valve for each port which opens into said reservoir, an air conduit for each generating chamber, a mechanically operated valve between said conduit and chamber, means for supplying air to said conduit under pressure, and a liquid fuel nozzle in said air conduit, whereby when the valve between the air conduit and generating chamber is opened, the liquid fuel will be blown and sprayed into said generating chamber by the air passing through the conduit at a high velocity.

2. A rotary internal combustion engine, comprising a cylinder, a reservoir, and a series of pressure-generating chambers arranged in superposed relation and connected together to form a compact structure, a rotor in said cylinder, an outlet from said reservoir connected to said cylinder, an outlet port for each pressure-generating chamber and an outwardly opening pressure operated valve for each port and adapted to open into said reservoir, and means for blowing a spray of liquid fuel in said pressure-generating chambers through the medium of air at high pressure.

3. A rotary internal combustion engine, comprising a cylinder, a reservoir, and a series of pressure-generating chambers arranged in superposed relation and connected together to form a compact structure, a rotor in said cylinder, an outlet from said reservoir connected to said cylinder, an outlet port for each pressure-generating chamber and an outwardly opening pressure operated valve for each port and adapted to open into said reservoir, and means for blowing a spray of liquid fuel in said pressure-generating chambers, said fuel blowing means embodying a conduit for each generating chamber, an air pump connected to all of said conduits, and a fuel nozzle in each conduit between said chambers and pump, whereby the air is blown at a high velocity over said fuel nozzle to said chambers.

In testimony whereof I affix my signature in presence of two witnesses.

JOHN SCHNITTER.

Witnesses:
 HOWARD D. ADAMS,
 E. WALTON BREWINGTON.